United States Patent [19]

Locke et al.

[11] Patent Number: 4,859,714

[45] Date of Patent: Aug. 22, 1989

[54] PROCESS AND COMPOSITION FOR PROTECTING AND CUSHIONING

[75] Inventors: Ralph J. Locke, Boyne City, Mich.; David C. Netherton, Valparaiso, Ind.

[73] Assignee: Plan B, Inc., Wauwatosa, Wis.

[21] Appl. No.: 287,129

[22] Filed: Dec. 20, 1988

Related U.S. Application Data

[62] Division of Ser. No. 167,404, Mar. 14, 1988.

[51] Int. Cl.$^4$ .............................................. C08J 9/12
[52] U.S. Cl. ..................................... 521/140; 521/82; 521/134
[58] Field of Search ................. 525/210; 521/134, 140, 521/82

[56] References Cited

U.S. PATENT DOCUMENTS

| | | | |
|---|---|---|---|
| 2,556,278 | 6/1951 | Irvine | 409/197 |
| 3,912,665 | 10/1975 | Spitzer et al. | 524/149 |
| 3,983,258 | 9/1976 | Weaver | 426/307 |
| 4,059,466 | 11/1977 | Scholl et al. | 156/78 |
| 4,101,711 | 7/1978 | Stillman | 428/35.2 |
| 4,136,203 | 1/1979 | Murphy et al. | 426/124 |
| 4,136,205 | 1/1979 | Quatterbaure | 426/412 |
| 4,202,279 | 5/1980 | Rand | 521/913 |
| 4,243,768 | 1/1981 | Simpson | 525/455 |
| 4,532,273 | 6/1985 | Kadowaki et al. | 524/508 |
| 4,532,281 | 7/1985 | Lee, Jr. | 524/508 |
| 4,534,984 | 8/1987 | Kuehne | 423/412 |
| 4,645,783 | 2/1987 | Kinoshita | 524/522 |
| 4,677,133 | 6/1987 | Leicht | 521/51 |
| 4,764,535 | 8/1988 | Leicht | 521/51 |
| 4,784,736 | 11/1988 | Londsdale | 540/139 |

*Primary Examiner*—Morton Foelak
*Attorney, Agent, or Firm*—Basile and Hanlon, PC

[57] ABSTRACT

A process for packaging a product, particulary one with sharp protrusions, a composition for cushioning the sharp protrusions during packaging and a foamed material prepared therefore, the process including the steps of applying a foamed composition to the product to be packaged; and encasing the product in an outer package. The foamed material can be applied in liquid or semiliquid form at a point-of-contact temperature less than about 130° F. and solidifies substantially on contact. The foamed material is, preferably, applied selectively to cover the sharp protrusions and contains a chemical substrate containing a polymer having the general formula, a resin and a stabilizer. A suitable gas is encapsulated therein. The process, composition and foamed material have particular utility in the meat-packing industry.

6 Claims, No Drawings

PROCESS AND COMPOSITION FOR PROTECTING AND CUSHIONING

CROSS-REFERENCE TO RELATED APPLICATIONS

This application is a divisional application of U.S. Ser. No. 167,404 filed on March 14, 1988 which is currently pending before the United States Patent and Trademark Office.

BACKGROUND OF THE INVENTION

1. Field of the Invention

This invention relates to packaging processes; particularly those pertaining to packing of items having sharp protrusions and those pertaining to packing of edible products. Additionally, this invention relates to foamed polymeric materials suitable for use in such processes and compounds useful in the production of such foamed materials.

2. Description of the Relevant Art

In a variety of areas it is necessary to package products in such a manner as to cushion sharp protrusions or particularly fragile portions. This is particularly necessary in food industries such as meat packing where products are wrapped in, air-tight polymeric films.

When animal carcasses are prepared for shipping, they are often subdivided into portions and individually wrapped in an outer wrapper for preservation and protection during shipping and handling. The preferred outer wrap is an air-tight polymeric material in which the cut of meat may be vacuum packed and sealed. The size of the cuts of meat vary from smaller consumer-sized portions to very large "primal cuts" weighing many pounds.

Most meat portions are irregularly shaped and contain bones which protrude at one or more places on the cut. The protrusions which can be relatively sharp, tear and pierce the outer polymeric wrap in which the meat is encased. During storage and shipment from packing plant to warehouse, retailer or user, the cut is handled several times; further increasing the chances of puncture or tearing of the outer wrap. This is particularly possible at the points of contact between the bag and the protruding bone. Vacuum packaging to increase storage life also increases the risk of the outer wrap tearing. In vacuum packaging, the wrap is forced to conform to the contours of the meat during the evacuation process. This can cause stretching and strain over the protruding areas.

Various approaches have been tried to overcome the problems associated with torn or leaking outer wrappers. For example, the outer wrapper material may be strengthened to resist puncture. This would entail modification to the content or thickness uniformly throughout the wrapper which would be expensive and unnecessary in view of the fact that the areas likely to be punctured are relatively limited.

Specialized containers have been proposed such as the one disclosed in U.S. Patent Number 4,136,205 to Quattlebaum. Such containers or bags are generally reinforced with suitable cloth or strengthening material at points in the bag which roughly correspond to the protrusions. These containers are relatively expensive and require accurate placement of the meat cut within them if they are to function satisfactorily. Many configurations of these type of containers in many sizes may be necessary to package different cuts of meat as the various cuts have different contours and protrusions. Additionally, the carcasses of a particular type of animal may vary greatly in size and weight.

Currently, the common practice in the meat packing industry is to swath the cut of meat in a large piece of a wax-impregnated, non-absorptive fabric prior to insertion in the outer wrapper. The fabric is interposed between the wrapper and the meat at puncture prone areas such as bone ends. Examples of such material are found in U.S. Pat. Nos. 2,891,870 and 3,653,927. In order to insure that the protrusions are adequately covered during insertion in the outer wrap, large amounts of the fabric must be used covering major portions of the meat cut. This process is laborious time-consuming, expensive and generates a great deal of waste material and labor when the wrap is removed.

Because of these drawbacks, other methods of cushioning sharp protrusions have been proposed. Attempts have been made to cushion meat cuts in a variety of preformed foam materials positioned between the meat and wrapper. As indicated in U.S. Pat. No. 4,136,203 to Murphy, generally these attempts have not been satisfactory due to discoloration of meat in contact with the foam caused by residual oxygen present in the foam. In order to overcome this problem, the Murphy reference proposes the use of an oxygen impervious wrapper film between the meat and foam. Additionally, the mass of the foam and wrapper employed in Murphy created transportation problems; adding weight and volume to each carcass and increasing transport costs, clearly, this solution does not promote packing efficiency or economy.

Direct application of liquified, contact hardening cushioning materials, either foamed or non-foamed, to the meat has met with several drawbacks. Heretofore, all materials available had to be applied at a temperature so high as to cause scalding and discoloration of the meat. In addition, many known cushioniong materials were inappropriate for use with edible products. Others did not set rapidly enough to provide complete coverage.

Thus, it is desirable to provide a process for packaging products, particularly edible products such as meat, which reduces the chance of package rupture. It is desirable that this process employ a polymeric material which can be easily and selectively applied to protrusions without causing discoloration or blemishing of the meat. It is also desirable to provide a process in which a foamed material can be produced at the use site and dispatched at low temperatures. Finally, it is desirable to produce a foamed polymeric material which can be employed in a variety of packaging and outer applications.

SUMMARY OF THE INVENTION

The present invention involves a process for packaging a product; particularly a product with sharp protrusions in which a foamed material is applied selectively to the product and the product is enclosed in an outer wrapping. The foamed material is formed from a polymer having a molecular weight between about 1,800 and about 25,000 selected from the group consisting of polyethylene, ethylene vinyl acetate and mixtures thereof. Also, included in the foamed material is a suitable aliphatic hydrocarbon selected from the group consisting of polyterpenes, five-carbon hydrocarbons and mixtures thereof. Also present in the foamed material is a suitable anti-oxidant stabilizer. The foamed material is produced by admixture of the above-listed components in a liquid or semi-liquid state with a suitable gaseous blowing agent. The material can be applied to a product such as a cut of meat at a points of contact temperature between about 80° F. and about 130° F.

DESCRIPTION OF THE PREFERRED EMBODIMENT

This invention is predicated on the unexpected discovery that a newly formulated foamed material can be successfully applied at low temperatures on edible products such as cuts of meat without adversely affecting the quality of the product. Selective application of this foamed material on sharp protrusions provides a protective cushion against rupture or tearing of outer wrapping surrounding the cut of meat during shipping and storage.

Specifically, this invention encompasses a process for packing products, particularly those having sharp protrusions as well as a foamed material that can be used therein. Outer uses and applications of this invention will become apparent to one skilled in the art.

In the particular process of the present invention, fresh primal, subprimal or consumer-ready cuts of beef, pork, lamb or veal as well as poultry and fish having exposed bone surfaces with sharp jagged edges which would normally puncture a bag or similar package can be safely packaged. A foamed material is applied selectively to protrusions in the meat cut by a conventional means permit adherence between the foamed material and the surface of the cut of meat. The meat can, then, be encased by an outer wrapping such as a plastic bag.

The foamed material employed consists essentially of a polymeric substrate in which a suitable gaseous material is encapsulated. The polymeric substrate consists essentially of:

(a) a polymer having a molecular weight between about 1,800 and 25,000, selected from the group consisting of polyethylene, ethylene vinyl acetate and mixtures thereof;

(b) a hydrocarbon selected from the group consisting of polyterpenes, five-carbon aliphatic hydrocarbons and mixtures thereof;

(c) a stabilizer capable of preventing oxidation of the constituents of the polymer and surrounding materials. The polymeric substrate may also contain optional waxes, microcrystalline waxes, spoilage inhibitors and other components routinely employed in the packaging industry.

The polymeric substrate is prepared by the admixture of polymer, hydrocarbon, stabilizer and optional components with sufficient heating as is necessary to achieve liquification of substrate. The substrate is then admixed with a suitable gas to achieve foaming. In the preferred embodiment, liquid polymeric substrate is maintained at a temperature between about 265° F. and about 375° F. and is then, combined with a stream of gas in a ratio of gas to substrate between about 1:1 and about 1:10. The foamed material cools as it is dispensed with solidification beginning to occur at temperatures below about 250° F. It has been found that the foamed material can be successfully applied to various products using applicators such as the type employed in systems described in U.S. Patent Nos. 4,059,456 and 4,059,714 which are incorporated by reference herein. By employing such devices, point-of-contact temperatures between about 80° F. and 130° F. can be achieved. It has been found, quite unexpectedly, that the foamed material of the present invention remains sufficiently formable at temperatures this low to adhere readily to the product and conform to its shape.

As generally practiced in this invention, the polymeric substrate contains between 40% and about 90% by weight polymer, between about 10% and about 60% by weight hydrocarbon; and between about 0.01% and about 0.5% by weight stabilizer. In the preferred embodiment, the polymeric substrate contains between about 75% and about 90% by weight polymer, between about 3 and about 25% by weight hydrocarbon and between about 0.1 and about 0.3% by weight stabilizer.

In the preferred embodiment, the polymer is selected from the group consisting of polyethylene, polyvinyl acetate, ethylene vinyl acetate, and mixtures thereof. The polymer employed as a molecular weight between about 1,800 and about 25,000, with a molecular weight between about 17,000 and 19,000 being preferred. Suitable materials are commercially available from Eastman Chemical Corporation under the trademark EPOLENE and from E.I. DuPont Corporation under the trademark ELVAX.

The hydrocarbon employed is preferably an aliphatic hydrocarbon selected from the group consisting of polyterpenes, various five-carbon moleculars and mixtures thereof. Such materials are commerically available from Goodyear Corporation under the trademark WINGTACK and Hercules Corporation under the trademark PICOTACK B-H-T.

The stabilizer is preferably a material such as tetrakis [methylene (3,5-di-tert-butyl-4-hydroxy hydrocinnamate) methane. Suitable material is commercially available from Ciba-Geigy Corporation under the trademark IRGANOX.

Various additives can also be included in the formulation. These can include waxes such as microcrystalline waxes, antioxidants, preservatives and the like. Such additives can comprise up to about 40% by weight of the polymeric substrate.

The gaseous material employed can be any, which when combined with the polymeric substrate cause foaming. In the preferred embodiment, the gas is a non-oxidative, biologically inert material. The gas may be selected from the group consisting of nitrogen, helium, hydrogen, argon and mixtures thereof with preferred biologically inert materials selected from the group consisting of carbon dioxide, nitrogen and mixtures thereof. Where biological inertness is not required, it is also possible to employ other gases such as oxygen, air or mixtures thereof.

In the preferred embodiment of the process of the present, the polymeric substrate composition is admixed and maintained in a liquid or semi-liquid state until it is dispatched upon application to the product such as a cut of meat. Preferably the material is held at a tank temperature between about 265° F. and about 375° F. Prior to dispatch, the liquid or semi-liquid polymeric substrate is admixed with a suitable gas to entrain the gas therein. The gas and polymer mixture which forms the foamed material is, then, dispatched through a suitable applicator and applied to the product. The resulting polymer has the gas encapsulated therein.

In the process of the present invention, it is preferred that the foamed material have a temperature below about 130° F. at the point at which the foam contacts the product to be cushioned. Preferably the point-of-contact temperature is between about 80° F. and about 130° F. At temperatures within this range, the material can be applied directly to a cut of meat without the detrimental effects caused by localized heating. The foamed material retains sufficient flexibility to conform to the shape of the product and adheres readily to the product.

It has been found that the foamed material thus applied solidifies and adheres essentially simultaneously to form a solid cushion releasably attached to the cut of meat. The bond between meat and solidified foam is sufficiently strong to remain intact when jostled during subsequent wrapping and packaging. The solidified foam may be dislodged when desired by prying the foamed material off with minimal prying force.

After application of the foamed material, the product can be inserted into an outer wrapper package or bag This wrapper package is made of a suitable commerically available plastic such as those routinely used in the meatpacking industry. The outer wrapper may be closed or sealed by any conventional means. In the finished product, the foamed material is interposed between sharp protrusions and the wrapper such that the respective protrusion is cushioned and any force created by a sharp or jagged edge is either absorbed by or deflected throughout the overlying foamed material rather than being concentrated at the portion of the outer wrapper overlaying the protrusion.

Generally, when cuts of meat are packaged for storage and shipment, additional packaging steps can be performed as desired on products having the foamed material of the present invention with no detrimental effects. Such steps generally involve the evacuation of the atmosphere in the outer package by conventional vacuum packaging processes. Such processes have been found to increase shelf-life and ease of transport where maximum shelf-life is sought, the foamed material of the present invention can be formulated with biologically inert gases such as nitrogen, and the like to prevent any oxygen which may have been otherwise present in the foamed material from leaking from the interstices present in the foam and causing discoloration or spoilage. Additives can also be incorporated in the foam which inhibit bacterial growth or trigger conversion of residual oxygen present in the package to biologically inert materials.

It has been found, that the foamed material of the present invention will adhere to the outer wrapper material with a bond strength greater than the bond strength between the foamed material and the cut of meat when the package is exposed to certain procedures such as heat shrinking. Due to such bond strengths, removal of the outer wrap will cause automatic release of the foamed material from the product thereby eliminating its separate removal. Examples of outer wrap materials suitable for this application are polymers selected from the group consisting of low density polyethylene, ethylene vinyl acetate, polypropylene, nylon, polyvinyl chloride and mixtures thereof.

While preferred forms and arrangements of parts have been discussed, it is to be understood that various changes in detail and arrangement of parts as well as modification of the process to be applied to other products to be packaged are to be considered within the scope and spirit of this disclosure.

What is claimed is:

1. A foamed material consisting essentially of:
    a polymeric substrate and a gaseous material encapsulated therein, the chemical substrate and gaseous material present in a ratio of about 1:1 to about 1:10 gaseous material to substrate gaseous material to substrate respectively; wherein the foamed material solidifies after contacting the product and the polymeric substrate consists essentially of:
    (a) between about 40% and about 90% by weight of a polymer selected from the group consisting of polyethylene, ethylene vinyl acetate, and mixtures thereof;
    (b) between about 10% and about 90% by weight of polyterpene; and
    (c) between about 0.05% and abut 0.5% by weight of an anti-oxidant stabilizer.

2. The foamed material of claim 1 wherein solidification beings to occur between 200° F. and 250° F.

3. The foamed material of claim 1 wherein the polymer has a molecular weight between about 1,800 and about 25,000.

4. The foamed material of claim 3 wherein the polymer is present in an amount between about 15% and about 27% by weight.

5. The foamed material of claim 1 wherein the polyterpene is present in an amount between about 3% and about 7.5% by weight of the polymeric substrate.

6. The foamed material of claim 5 wherein the stabilizer is present in an amount between about 0.0005% and about 0.015% by weight.

* * * * *

UNITED STATES PATENT AND TRADEMARK OFFICE
CERTIFICATE OF CORRECTION

PATENT NO. : 4,859,714

DATED : August 22, 1989

INVENTOR(S) : Ralph J. Locke and David C. Netherton

It is certified that error appears in the above-identified patent and that said Letters Patent is hereby corrected as shown below:

In the Title, line 2, after "CUSHIONING" insert --PROTRUSIONS--.

In the Abstract, line 12, delete "having the".

In the Abstract, line 13, delete "general formula".

Column 1, line 3, after "CUSHIONING", insert --PROTRUSIONS--.

Column 1, line 26, delete ",".

Column 2, line 14, after "laborious", insert --,--.

Column 3, line 5, delete "points" and insert --point--.

Column 3, line 10, delete "predicted" and insert --predicated--.

Column 3, line 22, delete "Outer" and insert --Other--.

Column 3, line 31, after "means", insert --to--.

Column 4, line 17, delete "as" and insert --has--.

Column 4, line 26, delete "moleculars" and insert --molecules--.

Column 4, lines 32 and 33, delete "(3,5-di-tert-butyl-4-hydroxy hydrocinnamate)" and insert --(3,5-di-tert-butyl-4-hydroxyhydrocinnamate)]--.

Column 4, line 42, delete "cause" and insert --, causes--.

Column 4, line 53, after "present", insert --invention--.

UNITED STATES PATENT AND TRADEMARK OFFICE
CERTIFICATE OF CORRECTION

PATENT NO. : 4,859,714

DATED : August 22, 1989

INVENTOR(S) : Ralph J. Locke and David C. Netherton

It is certified that error appears in the above-identified patent and that said Letters Patent is hereby corrected as shown below:

Column 5, line 16, after "bag", insert --.--.

Column 5, line 35, delete "where" and insert --. Where--.

In the Claims:

Column 6, line 22, delete "gaseous material to substrate", first occurrence.

Column 6, line 32, delete "abut" and insert --about--.

Signed and Sealed this

Twenty-ninth Day of January, 1991

Attest:

HARRY F. MANBECK, JR.

*Attesting Officer*          *Commissioner of Patents and Trademarks*